United States Patent
Lin et al.

(10) Patent No.: US 7,725,442 B2
(45) Date of Patent: May 25, 2010

(54) AUTOMATIC EVALUATION OF SUMMARIES

(75) Inventors: Chin-Yew Lin, El Segundo, CA (US); Jianfeng Gao, Kirkland, WA (US); Guihong Cao, Montreal (CA); Jian-Yun Nie, Montreal (CA)

(73) Assignee: Microsoft Corporation, Redmond, WA (US)

( * ) Notice: Subject to any disclaimer, the term of this patent is extended or adjusted under 35 U.S.C. 154(b) by 400 days.

(21) Appl. No.: 11/672,038

(22) Filed: Feb. 6, 2007

(65) Prior Publication Data
US 2008/0189074 A1  Aug. 7, 2008

(51) Int. Cl.
G06F 7/00 (2006.01)
G06F 17/30 (2006.01)

(52) U.S. Cl. ............................ 707/688; 707/730

(58) Field of Classification Search ............ None
See application file for complete search history.

(56) References Cited

U.S. PATENT DOCUMENTS

| 5,778,397 | A |   | 7/1998 | Kupiec et al. ............ 707/500 |
| 5,857,179 | A | * | 1/1999 | Vaithyanathan et al. ...... 707/2 |
| 5,918,240 | A |   | 6/1999 | Kupiec et al. ............ 707/531 |
| 5,924,108 | A | * | 7/1999 | Fein et al. ............... 715/267 |
| 6,185,592 | B1| * | 2/2001 | Boguraev et al. .......... 715/256 |
| 6,317,708 | B1| * | 11/2001| Witbrock et al. ........... 704/9 |
| 6,751,776 | B1|   | 6/2004 | Gong ..................... 715/500.1 |
| 6,925,433 | B2|   | 8/2005 | Stensmo .................. 704/9 |
| 7,017,114 | B2| * | 3/2006 | Guo et al. ................ 715/247 |
| 7,117,437 | B2| * | 10/2006| Chen et al. .............. 715/254 |
| 7,120,613 | B2|   | 10/2006| Murata ................... 706/12 |
| 7,392,280 | B2| * | 6/2008 | Rohall et al. ............ 709/201 |
| 2002/0194158 | A1| * | 12/2002 | Stensmo ............... 707/2 |
| 2003/0163790 | A1| * | 8/2003  | Murata ................. 715/531 |
| 2003/0182631 | A1| * | 9/2003  | Tsochantaridis et al. ... 715/531 |
| 2005/0102619 | A1|   | 5/2005  | Hijikata et al. ........ 715/530 |

OTHER PUBLICATIONS

Zaragoza et al. "Bayesian Extension to the Language Model for Ad Hoc Information Retrieval" (SIGIR'03, Jul. 28-Aug. 1, 2003, Toronto, Canada. ACM, pp. 4-9).*
Lin et al., "Manual and Automatic Evaluation of Summaries," Proceedings of the Workshop on Automatic Summarization, Philadelphia, Jul. 2002, pp. 45-51.
Dorr et al., "Extrinsic Evaluation of Automatic Metrics for Summarization," Jul. 20, 2004 Technical Report: LAMP-TR-115/CAR-TR-999/CS-TR-4610/UMIACS-TR-2004, U of Maryland.
Lin et al., "Looking for a Few Good Metrics: ROUGE and its Evaluation" 2004 National Institute of Informatics, Tokyo, Jun. 2-4, 2004.
Lin et al., "Automatic Evaluation of Summaries Using N-gram Co-Occurrence Statistics" In Proceedings of the Human Technology Conference 2003 (HLT-NAACL-2003), May 27-Jun. 1, 2003, Edmonton, Canada.

(Continued)

Primary Examiner—Charles Rones
Assistant Examiner—Daniel Kuddus
(74) Attorney, Agent, or Firm—Theodore M. Magee; Westman, Champlin & Kelly, P.A.

(57) ABSTRACT

A probability distribution for a reference summary of a document is determined. The probability distribution for the reference summary is then used to generate a score for a machine-generated summary of the document.

11 Claims, 3 Drawing Sheets

OTHER PUBLICATIONS

Hori et al., "Evaluation Measures Considering Sentence Concatenation for Automatic Summarization by Sentence or Word Extraction" ICSLP 2004, 2004.

Zajic, et al., "BBN/UMD at DUC-2004: Topiary" Proceedings of North American Chapter of the Assoc. for Computational Linguistics Workshop on Document Understanding, 2004.

Berger et al., "Information Retrieval as Statistical Translation," Proceedings of ACM-SIGIR 1999, Aug. 15-19, 1999, Berkeley, CA, USA.

Lafferty et al., "Document Language Models, Query Models, and Risk Minimization for Information Retrieval," Proceedings of ACM-SIGIR 2001, Sep. 9-13, 2001, New Orleans, LA, USA.

Ponte et al., "A Language Modeling Approach to Information Retrieval," Proceedings of ACM-SIGIR 1998, pp. 275-281, Aug. 24, 1998, Melbourne, Australia.

Zhai et al., "A Study of Smoothing Methods for Language Models Applied to Information Retrieval," ACM Transactions on Information Systems, vol. 22, No. 2, Apr. 2004, pp. 179-214.

Zaragoza, et al., "Bayesian Extension to the Language Model for Ad Hoc Information Retrieval," SIGIR '03, Jul. 28-Aug. 1, 2003, Toronto, Canada.

* cited by examiner

AUTOMATIC EVALUATION OF SUMMARIES

BACKGROUND

In order to provide better access to large document collections, it is desirable to develop automatic summarizers that will produce summaries of each document or a summary of a cluster of documents. One obstacle to developing such summarizers is that it is difficult to evaluate the quality of the summaries produced by the automatic summarizers, and therefore it is difficult to train the summarizers.

One ad-hoc technique for evaluating automatic summaries involves determining how many words found in a manually-created summary are also found in the automatic summary. The number of words found in the automatic summary is divided by the total number of words in the manual summary to provide a score for the automatic summary. This ad-hoc measure is less than ideal because there is no theoretical justification for believing that it would provide scores that correlate to the quality of a summary. In fact, it has been observed that summaries that receive a poor score using this ad-hoc measure are often judged to be good summaries when evaluated by a person.

The discussion above is merely provided for general background information and is not intended to be used as an aid in determining the scope of the claimed subject matter.

SUMMARY

A probability distribution for a reference summary of a document is determined. The probability distribution for the reference summary is then used to generate a score for a machine-generated summary of the document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
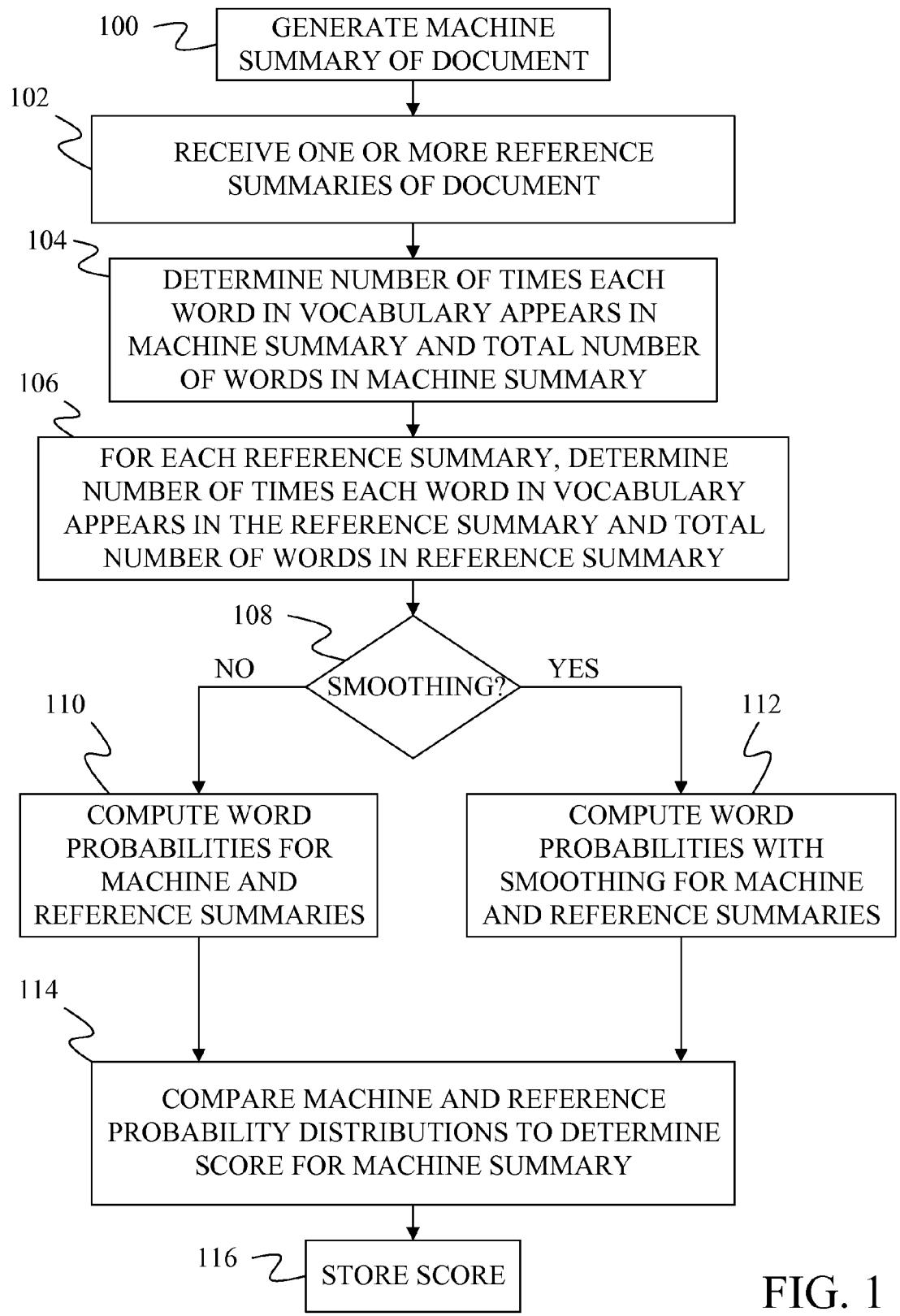
FIG. 1 is a flow diagram of a method of forming an evaluation score for a machine-generated summary.

Under the embodiments described below, an information-theoretic approach is used for automatic evaluation of summaries. Under an information-theoretic approach, probability distributions that describe the informational content of a machine-generated summary and one or more reference summaries are compared to each other to provide a measure of the quality of the machine-generated summary. The reference summaries can be produced using trusted machine summarizers or one or more human summarizers.

Under several embodiments, the probability distributions that are compared are formed by assuming that the machine-generated summary and the trusted summaries are generated by a probabilistic generative model. Under one embodiment, the probability distribution for the machine-generated summary, $\theta_A$, is defined using a multinomial generative model that consists of a separate word probability $\theta_{A,i}$ for each word in a vocabulary of m words such that $\theta_A = \{\theta_{A,1}, \theta_{A,2}, \ldots, \theta_{A,m}\}$ and $$\sum_{i=1}^{m} \theta_{A,i} = 1.$$

Similarly, the probability distribution for the reference summaries, $\theta_R$, is defined as a set of word probabilities, $\theta_R = \{\theta_{R,1}, \theta_{R,2}, \ldots, \theta_{R,m}\}$, where $$\sum_{i=1}^{m} \theta_{R,i} = 1.$$

The parameters that describe the probability distributions are determined from the machine-generated summary and the reference summaries. Under one embodiment, the parameters are determined based on a conditional probability of the probability distribution $\theta_A$ given the machine summary $S_A$, denoted as $P(\theta_A|S_A)$. Similarly, the parameters of the probability distribution for the reference summaries are determined based on the conditional probability of the probability distribution $\theta_R$ given a set of reference summaries $S_{R,1}, \ldots, S_{R,L}$, denoted as $P(\theta_R|S_{R,1}, \ldots, S_{R,L})$, where there are L reference summaries. Note that in some embodiments, L is 1 such that there is only one reference summary.

Under one embodiment, the conditional probabilities for the machine-generated summary, $P(\theta_A|S_A)$, are modeled as:

$$p(\theta_A|S_A) = Z_{a_0 + \alpha_0} \prod_{i=1}^{m} (\theta_{A,i})^{a_i + \alpha_i - 1} \qquad \text{EQ. 1}$$

where $a_i$ is the count of the number of times word $w_i$ appears in machine-generated summary $S_A$, m is the number of words in the vocabulary, $\theta_{A,i}$ is the word probability of word $w_i$ appearing in summary $S_A$, $\alpha_i$ is a hyper-parameter that represents an expected but unobserved number of times word $w_i$ should have appeared in summary $S_A$ and:

$$a_o = \sum_{i=1}^{m} a_i \qquad \text{EQ. 2}$$

$$\alpha_o = \sum_{i=1}^{m} \alpha_i \qquad \text{EQ. 3}$$

$$Z_{a_0 + \alpha_0} = \frac{\Gamma(a_o + \alpha_o)}{\prod_{i=1}^{m} \Gamma(a_i + \alpha_i)} \qquad \text{EQ. 4}$$

where $\Gamma(X)$ is a gamma function such that:

$$\Gamma(a_o + \alpha_o) = \int t^{a_o - \alpha_o - 1} e^{-t} dt \qquad \text{EQ. 5}$$

$$\Gamma(a_i + \alpha_i) = \int t^{a_i - \alpha_i - 1} e^{-t} dt \qquad \text{EQ. 6}$$

For L reference summaries, the conditional probability $P(\theta_R|S_{R,1}, \ldots, S_{R,L})$ is determined under one embodiment as:

$$p(\theta_R | S_{R,1} \ldots S_{R,L}) = Z'_{\alpha_0 + \sum_{j=1}^{L} a_{o,j}} \prod_{i=1}^{m} (\theta_{R,i})^{\alpha_i - 1 + \sum_{j=1}^{L} a_{i,j}} \quad \text{EQ. 7}$$

where $a_{i,j}$ is the count of the number of times the word $w_i$ appears in summary $S_{R,j}$ and:

$$Z'_{\alpha_0 + \sum_{j=1}^{L} a_{o,j}} = \frac{\Gamma\left(\alpha_o + \sum_{j=1}^{L} a_{o,j}\right)}{\prod_{i=1}^{m} \Gamma\left(\alpha_i + \sum_{j=1}^{L} a_{i,j}\right)} \quad \text{EQ. 8}$$

$$a_{o,j} = \sum_{i=1}^{m} a_{i,j} \quad \text{EQ. 9}$$

Under one embodiment, the probability distributions are selected to maximize the conditional posterior probabilities of equations 1 and 7. This results in word probabilities $\theta_{A,i}$ and $\theta_{R,i}$ of:

$$\theta_{A,i}^{MP} = \frac{a_i + \alpha_i - 1}{a_o + \alpha_o - m} \quad \text{EQ. 10}$$

$$\theta_{R,i}^{MP} = \frac{\sum_{j=1}^{L} a_{i,j} + \alpha_i - 1}{\sum_{j=1}^{L} a_{0,j} + \alpha_o - m} \quad \text{EQ. 11}$$

where $\theta_{A,i}^{MP}$ is the maximum posterior estimate of the word probabilities for the machine summary, and $\theta_{R,i}^{MP}$ is the maximum posterior estimate of the word probabilities for the reference summaries.

If the hyper-parameter $\alpha_i$ is set equal to 1 then the maximum posterior estimation of the word probabilities do not depend on the hyper-parameter. This produces maximum likelihood estimates for the word probabilities of:

$$\theta_{A,i}^{ML} = \frac{a_i}{a_o} \quad \text{EQ. 12}$$

$$\theta_{R,i}^{ML} = \frac{\sum_{j=1}^{L} a_{i,j}}{\sum_{j=1}^{L} a_{o,j}} \quad \text{EQ. 13}$$

Based on the maximum likelihood estimates of the word probabilities, the conditional probabilities are then defined as:

$$p(\theta_A^{ML} | S_A) = Z'_{a_o + m} \prod_{i=1}^{m} (\theta_{A,i}^{ML})^{a_i} \quad \text{EQ. 14}$$

$$p(\theta_R^{ML} | S_{R,1} \ldots S_{R,L}) = Z'_{m + \sum_{j=1}^{L} a_{o,j}} \prod_{i=1}^{m} (\theta_{R,i}^{ML})^{\sum_{j=1}^{L} a_{i,j}} \quad \text{EQ. 15}$$

One problem with using these maximum likelihood estimates is that when $a_i=0$ for any word in the vocabulary, the conditional posterior probability drops to zero for the entire probability distribution. To avoid this, probability mass is redistributed to the unseen word events under one embodiment. This process of redistribution is called smoothing in language modeling literature. Smoothing can be achieved by selecting a different value for $\alpha_i$. Under one embodiment, the value for $\alpha_i$ is set to $$\alpha_i = \mu p(w_i | C) + 1 \quad \text{EQ. 16}$$

where $p(w_i | C)$ is the probability of word $w_i$ in the vocabulary given a collection or corpus of documents C, and $\mu$ is a scaling factor, which under some embodiments is set to 2000. The probability $p(w_i | C)$ can be determined by counting the number of times word $w_i$ appears in the corpus of documents C and dividing that number by the total number of words in the corpus of documents. Using the definition of $\alpha_i$ in EQ. 16, a Bayes-smoothing estimate of the word probabilities can be determined as:

$$\theta_{A,i}^{BS} = \frac{a_i + \mu p(w_i | c)}{a_o + \mu} \quad \text{EQ. 17}$$

$$\theta_{R,i}^{BS} = \frac{\mu p(w_i | c) + \sum_{j=1}^{L} a_{i,j}}{\mu + \sum_{j=1}^{L} a_{o,j}} \quad \text{EQ. 18}$$

These Bayes-smoothing estimates of the word probabilities produce conditional posterior probabilities of:

$$p(\theta_A^{BS} | S_A) = Z'_{a_o + \mu + m} \prod_{i=1}^{m} (\theta_{A,i}^{BS})^{a_i + \mu p(w_i | C)} \quad \text{EQ. 19}$$

$$p(\theta_R^{BS} | S_{R,1} \ldots S_{R,L}) = Z'_{\sum_{j=1}^{L} a_{o,j} + \mu + m} \prod_{i=1}^{m} (\theta_{R,i}^{BS})^{\mu p(w_i | c) + \sum_{j=1}^{L} a_{i,j}} \quad \text{EQ. 20}$$

where $$Z'_{a_o + \mu + m} = \frac{\Gamma(a_o + \mu + m)}{\prod_{i=1}^{m} \Gamma(a_i + \mu + m)} \quad \text{EQ. 21}$$

$$Z'_{\sum_{j=1}^{L} a_{o,j} + \mu + m} = \frac{\Gamma\left(\sum_{j=1}^{L} a_{o,j} + \mu + m\right)}{\prod_{i=1}^{m} \Gamma\left(\sum_{j=1}^{L} a_{i,j} + \mu + m\right)} \quad \text{EQ. 22}$$

Figure 2:
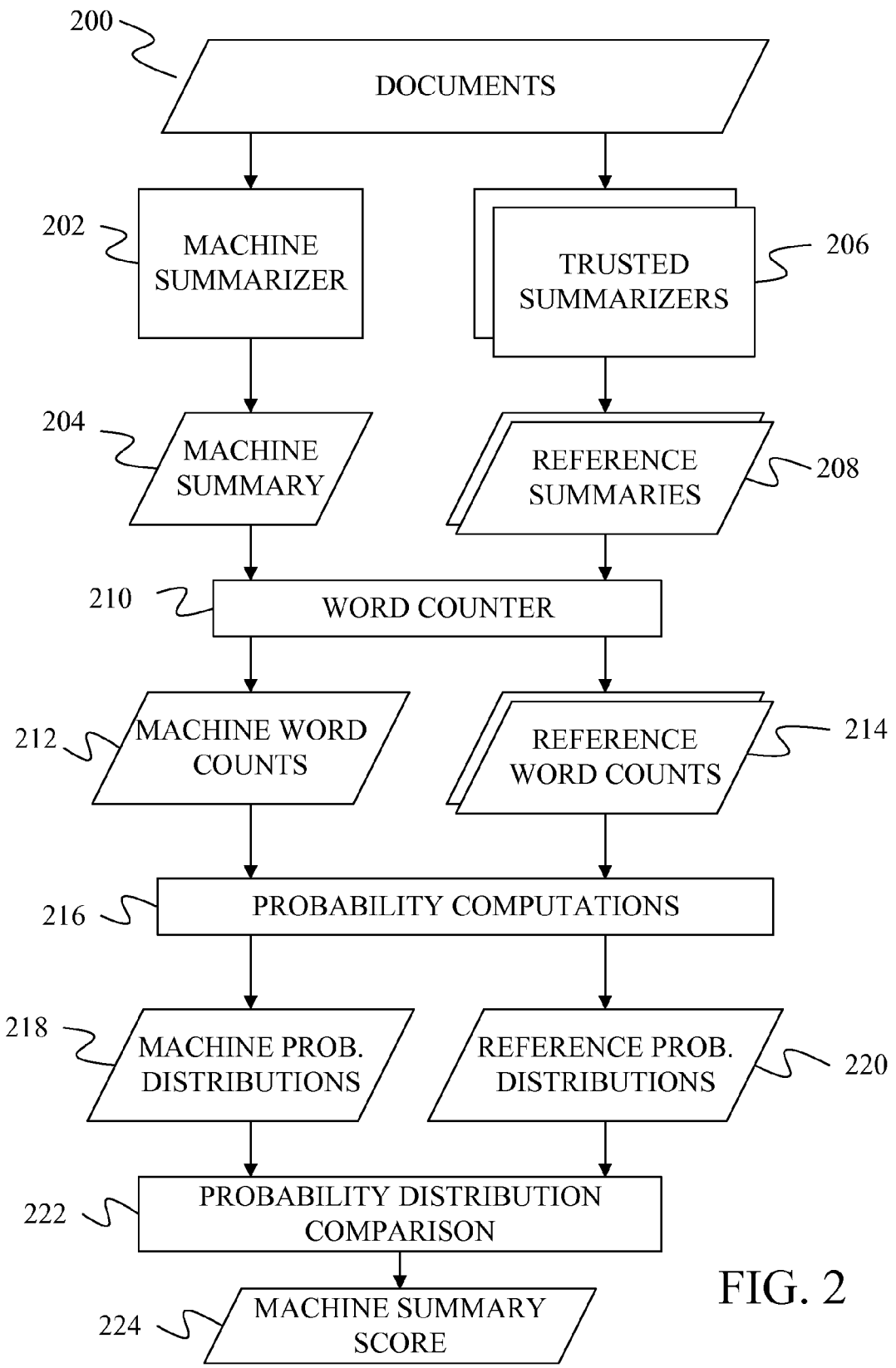
FIG. 2 is a block diagram of elements used in the method of FIG. 1.

FIG. 1 provides a method for generating and comparing probability distributions associated with a machine summary and one or more reference summaries. FIG. 2 provides a block diagram of elements used in the method of FIG. 1. In step 100 of FIG. 1, a machine summary 204 is generated from a document 200 by a machine summarizer 202. Techniques for automatically summarizing a document are well known in the art and any such techniques may be used by machine summarizer 202. At step 102, one or more trusted summarizers 206 form one or more reference summaries 208 of document 200. Trusted summarizers 206 may include people or trusted machine summarizers, where the trusted machine summarizers are known to provide good quality summaries.

At step 104, machine summary 204 is provided to a word counter 210, which counts the number of times each word in the vocabulary appears within the machine summary and the total number of words that are in the machine summary to produce machine word counts 212. At step 106, each of the reference summaries 208 is applied to word counter 210 to count the number of times each word in the vocabulary appears in each reference summary and the total number of words in each reference summary to produce reference word counts 214.

At step 108, a probability computations unit 216 determines if smoothing is to be used to compute word probabilities for the machine and reference summaries. If smoothing is not to be used, the word probabilities are computed at step 110 using EQS. 12 and 13, for example. If smoothing is to be used, the word probabilities are computed with smoothing at step 112 using EQS. 17 and 18 for example. The results of either step 110 or 112 are machine probability distributions 218 and reference probability distributions 220.

At step 114, the machine probability distributions are compared to the reference probability distributions by a probability distribution comparison unit 222 to produce a machine summary score 224 for the machine summary.

Under one embodiment, the machine probability distribution is compared to the reference probability distribution using a Jensen-Shannon Divergence measure. Under one embodiment, the score for the Jensen-Shannon Divergence is defined as:

$$JS(\theta_A^{ML}|\theta_R^{ML}) = -\frac{1}{2}\sum_i \left( \theta_{Ac,i}^{ML} \log\left(\frac{\theta_{A,i}^{ML}}{\frac{1}{2}\theta_{A,i}^{ML} + \frac{1}{2}\theta_{R,i}^{ML}}\right) + \theta_{R,i}^{ML} \log\left(\frac{\theta_{R,i}^{ML}}{\frac{1}{2}\theta_{A,i}^{ML} + \frac{1}{2}\theta_{R,i}^{ML}}\right) \right) \quad \text{EQ. 23}$$

where the summation is taken over all words in the vocabulary, $\theta_{A,i}^{ML}$ is defined in EQ. 12 and $\theta_{R,i}^{ML}$ is defined in EQ. 13 above.

In other embodiments, Jensen-Shannon Divergence with Smoothing is used to compare the probability distribution of the machine summary with the probability distribution of the reference summaries, where the score for Jensen-Shannon Divergence with Smoothing is defined as:

$$JS(\theta_A^{BS}|\theta_R^{BS}) = -\frac{1}{2}\sum_i \left( \theta_{A,i}^{BS} \log\left(\frac{\theta_{A,i}^{BS}}{\frac{1}{2}\theta_{A,i}^{BS} + \frac{1}{2}\theta_{R,i}^{BS}}\right) + \theta_{R,i}^{BS} \log\left(\frac{\theta_{R,i}^{BS}}{\frac{1}{2}\theta_{A,i}^{BS} + \frac{1}{2}\theta_{R,i}^{BS}}\right) \right) \quad \text{EQ. 24}$$

where $\theta_{A,i}^{BS}$ is the word probability with Bayes-smoothing for word $w_i$ as defined in EQ. 17 above for the machine-generated summary and $\theta_{R,i}^{BS}$ is the word probability with Bayes-smoothing for word $w_i$ as defined in EQ. 18 above for the reference summaries.

In other embodiments, the probability distribution for the machine-generated summary is compared to the probability distribution for the reference summaries using a Kullback-Leibler Divergence with Smoothing which is defined as:

$$Score_{summary}^{KL}(\theta_{A,i}^{BS}|\theta_{R,i}^{BS}) = -\sum_i \theta_{A,i}^{BS} \log\left(\frac{\theta_{A,i}^{BS}}{\theta_{R,i}^{BS}}\right) \quad \text{EQ. 25}$$

where $\theta_{A,i}^{BS}$ is the word probability for word $w_i$ as defined in EQ. 17 above for the machine-generated summary and $\theta_{R,i}^{BS}$ is the word probability $w_i$ as defined in EQ. 18 above for the reference summaries.

At step 116, the score produced by comparing the probability distribution for the machine-generated summary with the probability distribution for the reference summaries is stored. This stored score can be used to evaluate the performance of the machine summarizer and to alter the parameters of the machine summarizer to improve the performance of the machine summarizer during training. The stored score may also be used to select between two candidate machine summarizers.

The steps shown in FIG. 1 may be repeated for several documents to generate a separate score for each document. These scores may then be combined to form a total score for the machine summarizer that can be used during training of the machine summarizer or to select between one or more machine summarizers.

Figure 3:
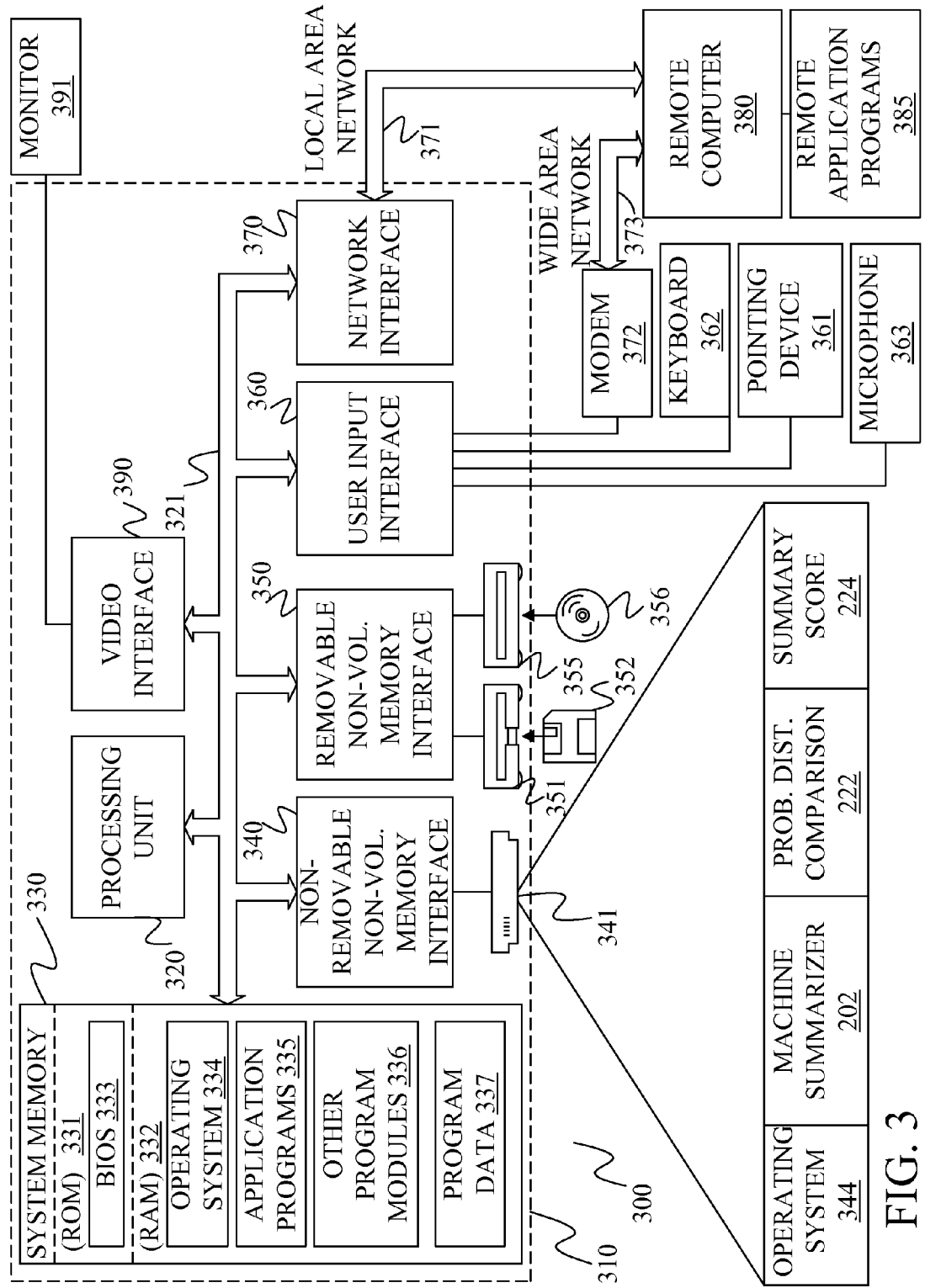
FIG. 3 is a block diagram of a general computing environment in which embodiments may be practiced.

FIG. 3 illustrates an example of a suitable computing system environment 300 on which embodiments may be implemented. The computing system environment 300 is only one example of a suitable computing environment and is not intended to suggest any limitation as to the scope of use or functionality of the claimed subject matter. Neither should the computing environment 300 be interpreted as having any dependency or requirement relating to any one or combination of components illustrated in the exemplary operating environment 300.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 3, an exemplary system for implementing some embodiments includes a general-purpose computing device in the form of a computer 310. Components of computer 310 may include, but are not limited to, a processing unit 320, a system memory 330, and a system bus 321 that couples various system components including the system memory to the processing unit 320.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, machine summarizer 202, probability distribution comparison unit 222, and machine summary score 224.

A user may enter commands and information into the computer 310 through input devices such as a keyboard 362, a microphone 363, and a pointing device 361, such as a mouse, trackball or touch pad. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390.

The computer 310 is operated in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on remote computer 380. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
a processor determining a probability distribution for a word in a plurality of reference summaries of a document as $$\theta_{R,i} = \frac{\mu p(w_i | c) + \sum_{j=1}^{L} a_{i,j}}{\mu + \sum_{j=1}^{L} a_{o,j}},$$

where $\theta_{R,i}$ is the probability distribution of word $w_i$ in the plurality of reference summaries, L is a number of reference summaries in the plurality of reference summaries, $a_{i,j}$ is a count of the number of times word $w_i$ appears in summary j, $p(w_i|c)$ is a probability of word $w_i$ given a corpus of documents c, μ is a scaling factor greater than one, and $a_{o,j}$ is a count of the number of words in summary j;

the processor determining a probability distribution for the word in a machine-generated summary as $$\theta_{A,i} = \frac{a_i + \mu p(w_i | c)}{a_o + \mu}$$

where $\theta_{A,i}$ is the probability distribution of word $w_i$ in the machine-generated summary, $a_i$ is a count of the number of times word $w_i$ appears in the machine-generated summary, $p(w_i|c)$ is the probability of word $w_i$ given a corpus of documents c, μ is the scaling factor, and $a_0$ is a count of the number of words in the machine-generated summary;

the processor comparing the probability distribution for the word in the reference summaries to the probability distribution for the word in the machine-generated summary to generate a score for a machine-generated summary of the document.

2. The computer-implemented method of claim 1 further comprising determining a probability distribution for a plurality of words in the plurality of reference summaries.

3. The computer-implemented method of claim 2 wherein probability distributions for a plurality of words comprise a separate word probability distribution for each word in the machine-generated summary.

4. The computer-implemented method of claim 1 wherein comparing the probability distribution for the reference summaries to the probability distribution for the machine-generated summary to generate the score comprises using one of a group of scoring functions consisting of a Jenson-Shannon divergence and a Kullback-Leibler divergence.

5. A computer-readable storage medium having computer-executable instructions for performing steps comprising:
determining a set of word probabilities for an automatically-generated summary of a document, each word probability $\theta_{A,i}$ determined as $$\theta_{A,i} = \frac{a_i + \mu p(w_i | c)}{a_o + \mu}$$

where $\theta_{A,i}$ is the word probability of word $w_i$ in the automatically-generated summary, $a_i$ is a count of the number of times word $w_i$ appears in the automatically-generated summary, $p(w_i|c)$ is a probability of word $w_i$ given a corpus of documents c, μ is a scaling factor greater than one, and $a_0$ is a count of the number of words in the automatically-generated summary;

determining a set of word probabilities for a plurality of reference summaries of the document, each word probability $\theta_{R,i}$ determined as $$\theta_{R,i} = \frac{\mu p(w_i | c) + \sum_{j=1}^{L} a_{i,j}}{\mu + \sum_{j=1}^{L} a_{o,j}},$$

where $\theta_{R,i}$ is the word probability of word $w_i$ in the plurality of reference summaries, L is a number of reference summaries in the plurality of reference summaries, $a_{i,j}$ is a count of the number of times word $w_i$ appears in reference summary j, $p(w_i|c)$ is the probability of word $w_i$ given a corpus of documents c, μ is the scaling factor, and $a_{o,j}$ is a count of the number of words in reference summary j;

comparing the set of word probabilities for the automatically-generated summary to the set of word probabilities for the at least one reference summary to produce a score for the automatically-generated summary.

6. The computer-readable storage medium of claim 5 wherein determining a set of word probabilities for at least one reference summary of the document comprises determining a set of word probabilities for a plurality of reference summaries of the document.

7. The computer-readable storage medium of claim 5 wherein comparing the set of word probabilities for the automatically-generated summary to the set of word probabilities for the at least one reference summary to produce a score comprises computing at least one of a group consisting of a Jensen-Shannon Divergence, a Jensen-Shannon Divergence with Smoothing, and a Kullback-Leibler Divergence with Smoothing.

8. A computer-implemented system comprising:
receiving a plurality of reference summaries for a document;
a processor using the plurality of reference summaries to determine a word probability for each of a plurality of words, each word probability $\theta_{R,i}$ determined as $$\theta_{R,i} = \frac{\mu p(w_i | c) + \sum_{j=1}^{L} a_{i,j}}{\mu + \sum_{j=1}^{L} a_{o,j}},$$

where $\theta_{R,i}$ is the word probability of word $w_i$ in the plurality of reference summaries, L is a number of reference summaries in the plurality of reference summaries, $a_{i,j}$ is a count of the number of times word $w_i$ appears in reference summary j, $p(w_i|c)$ is a probability of word $w_i$ given a corpus of documents c, μ is a scaling factor greater than one, and $a_{o,j}$ is a number of words in reference summary j;

the processor using the word probabilities determined from the reference summaries to generate a score for a machine-generated summary of the document; and
the processor storing the score.

9. The computer-implemented system of claim 8 further comprising using the machine-generated summary of the document to determine a second word probability for each of the plurality of words.

10. The computer-implemented system of claim 9 wherein using the word probabilities determined from the reference summaries to generate a score further comprises using the second word probabilities determined from the machine-generated summary with the word probabilities determined from the reference summaries to determine the score.

11. The computer-implemented system of claim 10 wherein determining a score comprises determining a Jensen-Shannon divergence between the word probabilities determined from the reference summaries and the second word probabilities determined from the machine-generated summary.

* * * * *